United States Patent [19]
Ishikawa

[11] 3,843,314
[45] Oct. 22, 1974

[54] SUSPENSION PREHEATER FOR FIRING SYSTEM

[75] Inventor: Yoshitaka Ishikawa, Tokyo, Japan

[73] Assignee: Sumitomo Shipbuilding & Machinery Co., Ltd., Tokyo, Japan

[22] Filed: Apr. 3, 1973

[21] Appl. No.: 347,528

[30] Foreign Application Priority Data
Apr. 3, 1972  Japan................................ 47-32578

[52] U.S. Cl................. 432/58, 34/57 R, 34/57 E, 432/16
[51] Int. Cl............................................. F27b 15/00
[58] Field of Search..................... 432/58, 14–16, 432/106, 61; 159/4 A, 4 E, 4 CC; 34/57 R, 10, 57 E

[56] References Cited
UNITED STATES PATENTS

| | | | |
|---|---|---|---|
| 2,335,732 | 11/1943 | Bowen | 159/4 CC |
| 2,580,235 | 12/1951 | Lellep | 432/61 |
| 2,675,070 | 4/1954 | Peebles | 159/4 D |
| 3,117,027 | 1/1964 | Lindlof et al. | 195/4 C |
| 3,118,658 | 1/1964 | Dennert | 432/58 |
| 3,146,998 | 9/1964 | Golucke et al. | 432/16 |
| 3,404,199 | 10/1968 | Hoffmann | 432/14 |
| 3,416,778 | 12/1968 | Chabaglian | 432/133 |
| 3,452,968 | 7/1969 | Shimizu et al. | 34/57 R |
| 3,671,027 | 6/1972 | Frans | 432/117 |
| 3,744,962 | 7/1973 | Ritzmann | 432/16 |
| 3,752,455 | 8/1973 | Zacpal et al. | 432/58 |

*Primary Examiner*—John J. Camby
*Assistant Examiner*—Henry C. Yuen
*Attorney, Agent, or Firm*—Sughrue, Rothwell, Mion, Zinn & Macpeak

[57] ABSTRACT

A suspension preheater for use with a firing system which comprises a heat exchange shaft having a gas inlet port mounted on its inner peripheral wall for tangentially blowing hot working gases thereinto and combustion means mounted in its lower portion for generating a bright flame along its longitudinal axis. The bright flame thus generated is confined within the swirling hot gases and affords ample heat to the particulate material therein, which are falling in the form of a cylindrical layer outside of the swirling hot gases by way of radiant heat without directly firing the particulate material. The heat exchange efficiency to the raw materials is highly improved to provide a high level of real calcination even at short retention times.

1 Claim, 6 Drawing Figures

SUSPENSION PREHEATER FOR FIRING SYSTEM

BACKGROUND OF THE INVENTION

The present invention relates to improvements in suspension preheaters for use with a cement firing kiln, and more particularly to an improved suspension preheater having a higher percentage of real calcination of raw materials.

Conventional suspension preheaters accomplish calcination of raw materials by preheating and firing the same by the use of the exhaust gases coming from a rotary kiln. However, when the exhaust gases introduced into the suspension preheater are excessively heated, for instance, to a temperature higher than about 1,100°C, a portion of the powdered raw materials are rendered patially molten and adhere to the inside wall of the suspension preheater which is at a temperature lower than about 1,100°C, thus inviting blocking of the passages of the gases and the materials to render the system inoperative.

In order to eliminate the above "ring" phenomenon, the temperature of the exhaust gases delivered into the suspension preheater is kept at a level lower than about 1,100°C. As a result, the gas balance, material balance and heat balance, and the temperature distribution of all portions of the system have substantially the same values. For example, the heat consumption per 1 kg of clinker is about 800 Kcal, the nominal quantity of gas generated (in the case of heavy oil burning) is about 1.2 Nm$^3$ per 1 Kg of clinker, the percentage of real calcination at the outlet of the suspension preheater is about 20 percent, the temperature at the same position is about 800°C, the gas temperature at the outlet of the kiln is about 1,050°C, and the gas temperature at the outlet of the suspension preheater is about 350°C.

In a kiln provided with a conventional suspension preheater, therefore, less than the available quantity of heat in the exhaust gases in the suspension preheater is used for heatexchange purposes.

The caloric heat of decarbonization of limestone (CaCo$_3$) is known to reach about 480 Kcal per 1 kg of clinker, which is about 60 percent of the total heat consumption of about 800 Kcal per 1 Kg of clinker which is required to produce cement clinker. As is shown in FIG. 3, which will be later described in detail, the equilibrium pressure of decarbonization of CaCO$_3$ is 760 mm Hg at about 890°C, and as such this material will be subject to quick decarbonization at a temperature exceeding about 890°C. In addition, the retention time of the raw materials within the suspension preheater is considered to range between several 10 seconds and several 100 seconds, depending upon the type of the preheater used. It is, accordingly, necessary to heat the raw materials up to a temperature higher than about 850°C so as to effect calcination of the same within a short time period. As is described above, however, the temperature of the exhaust gases fed into the preheater is restricted to a temperature lower than about 1,100°C, thus providing a limited level of heat effective for the decarbonization determined by a temperature difference of about 250°C (namely, 1,100°–850°C).

For this reason, the ratio of the caloric heat of decarbonization in a conventional suspension preheater to that of the whole system preheater and rotary kiln cannot exceed about 25 percent.

SUMMARY OF THE INVENTION

It is, therefore, a primary object of the present invention to provide an improved suspension preheater for a kiln in which the heat consumption per 1 Kg of cement clinker produced is reduced.

Another object of the present invention is to provide an improved suspension preheater of the above type in which the heat exchange efficiency is augmented without causing a temperature rise in the exhaust gases at the kiln outlet.

Still another object is to provide an improved suspension preheater in which raw materials are heated quickly and uniformly so as to obtain a greater than 70 percent real calcination even at a short retention time.

A further object is to provide an improved suspension preheater in which direct firing of the raw materials is prevented so as not to heat the same up to a temperature higher than about 1,100°C.

In order to accomplish the above objects, the suspension preheater according to the present invention comprises a heat exchange shaft having its gas inlet port mounted on its inner peripheral wall for tangentially blowing thereinto hot working gases, and combustion means mounted in its lower portion for generating a bright flame along its longitudinal axiz.

These and other objects and advantages of the present invention will be described with reference to the accompanying drawings.

DESCRIPTION OF THE PREFERRED EMBODIMENT

Figure 1:
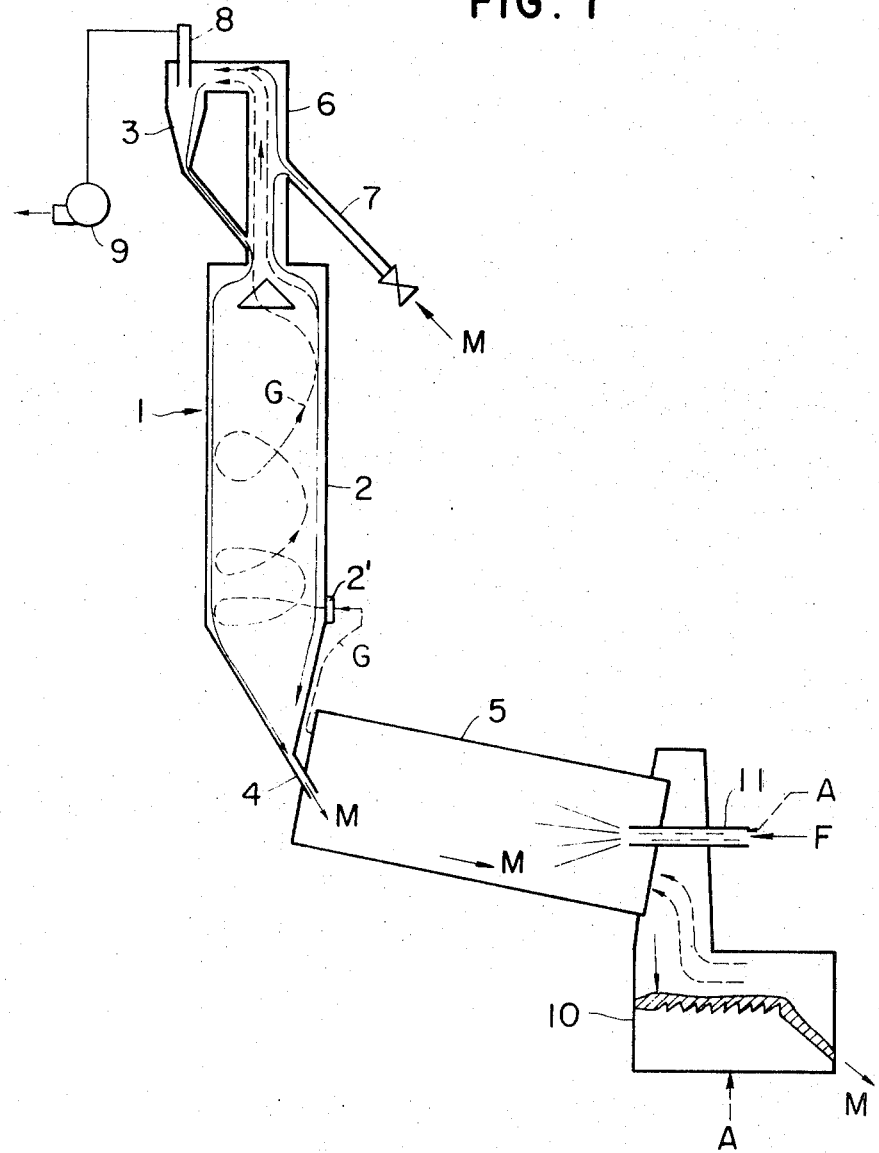
FIG. 1 is a diagrammatical view showing, partially in longitudinal section, an example of a prior art plant or system for producing cement clinker.

Referring now to FIG. 1 shwoing a kiln provided with a conventional suspension preheater, reference numeral 1 is the suspension preheater, in which: (1) the raw materials are supplied to the head portion of a large heat exchange shaft 2 of large diameter as shown by the arrow M; (2) the hot working gases are tangentially supplied to the large heat exchange shaft 2 at the bottom portion thereof (as shown by the arrow G) so as to heat the raw materials while the raw materials and the hot gases flow helically upward together; (3) the hot gases are then tangentially drawn at the head portion of the large heat exchange shaft 2; (4) the particulate or dust portions of the materials are separated from the gases by the action of a cyclone 3; (5) the dust portions thus separated are fed back into the head portion of the large heat exchange shaft 2; and (6) the recycled dust materials are then subject to concentration and the concentrated materials are supplied to a rotary kiln 5 by way of a conduit 4.

Reference numeral 6 is a small heat exchange shaft for providing fluid communication between the large heat exchange shaft 2 and the cyclone 3, between which a material feed pipe 7 is connected. The cyclone 3 is connectd with blower 9 by way of conduit 8.

As shown, the rotary kiln 5 is preferably slightly inclined toward the material discharge side, at which side clinker cooler 10 is provided through which burner 11 is inserted into the end of the rotary kiln 5.

Figure 6:
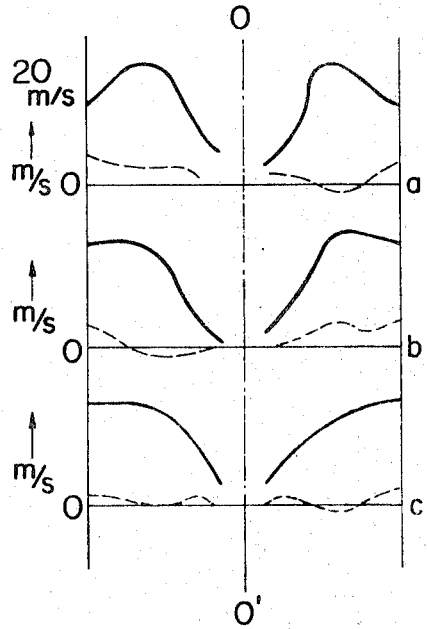

When the raw materials are fed into the smaller heat exchange shaft 6 during operation by way of the material feed pipe 7, they are floated in the hot gases, which are introduced into the large heat exchange shaft 2 from the rotary kiln 5 through an inlet port 2' provided at the lower portion of the large heat exchange shaft 2 leaving a relatively quiescent axial core as explained further with reference 6. FIG. 6 The raw material and the hot gases form a swirling flow within the large heat exchange shaft 2, after which they the are fed into the cyclone 3 via through the smaller heat exchange shaft 6.

In the cyclone 3, the raw materials are separated they settle back from the hot gases, and after the separation into the large heat exchange shaft 2. A portion of the materials are again passed into the small heat exchange shaft 6 and continue recirculating in the passage including the smaller heat exchange shaft 6, the cyclone 3, and the large heat exchange shaft 2, where heat exchange between the circulating materials and the hot flue gases occurs.

Since the supply of the materials M is effected continuously, the concentration (called the mixture ratio) of the recirculating materials in the flue gases will also be increased continuously up to an upper limit. After the mixture ratio has reached this upper limit, the excess portion of the materials M will fall down into the large heat exchange shaft 2. The falling materials M are swirled by the action of the tangential flow of the flue gases G. At this instant, the materials M are subject to a radial outward displacement toward the peripheral wall of the large heat exchange shaft 2, due to the centrifugal force of their swirling movement. Thus, the materials M will fall down in the form of a thin layer adjacent the inner peripheral wall of the shaft 2. During this time, heat exchange is effected between the materials M and the flue gases G partially by radiation (because the flue gases contain 20 to 30 percent of $CO_2$ and $H_2O$, and as such have emissivity), and partially by forced convection. After this heat exchange operation, the materials M are introduced into the rotary kiln 5. The supply of the flue gases G made to swirl within the suspension preheater 1 for heating the materials M is performed by introducing the exhaust gases of the kiln 5 into the large heat exchange shaft 2 of a cylindrical shape in the tangential direction by way of a gas inlet port 2' which is mounted in the peripheral wall of the shaft 2. As has been explained above, the temperature of the flue gases thus introduced should not exceed about 1,100°C. On the other hand, the materials M delivered into the rotary kiln 5 are heated and fired by the hot flue gases and flames generated by the burner 11, but this process is well known in the art and as such its discussion will be omitted. Finally, reference letters A and F indicate air and fuel (heavy oil) feeds, respectively.

Figure 2:
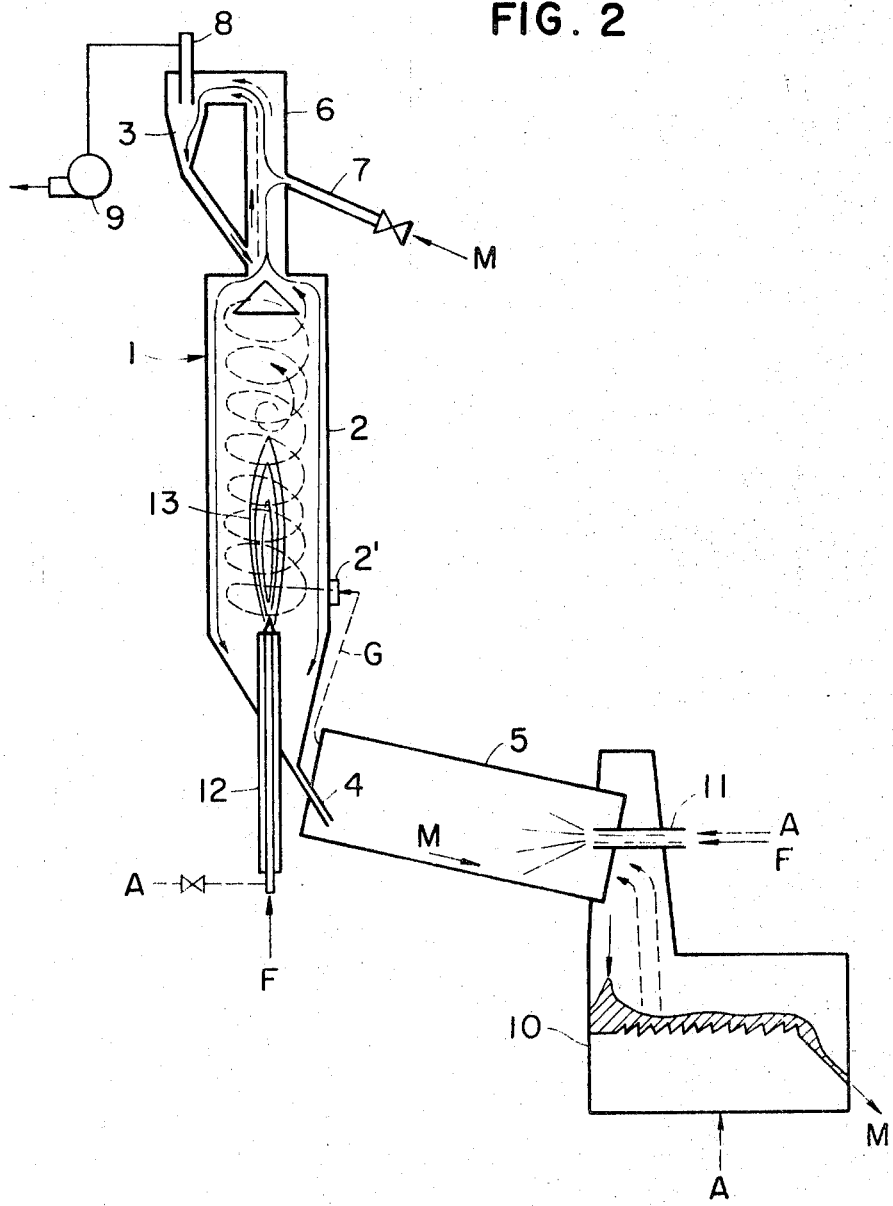
FIG. 2 is similar to FIG. 1 but shows a cement-clinker producing system according to the present invention.
Figure 3:
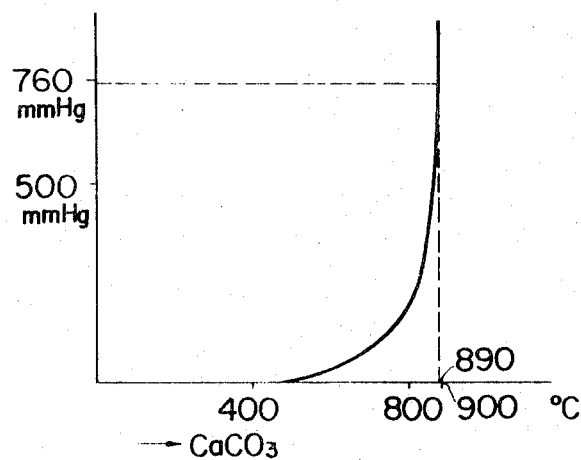
FIG. 3 is a graphic representation of the equilibrium pressure of decarbonization of CaCO$_3$ plotted against temperature.

FIG. 2 shows a kiln provided with suspension preheater according to the present invention. Combustion means 12 is provided at the bottom portion of the large heat exchange shaft 2. Combustion means 12 is supplied with fuel F and combuston air A for producing vertical bright flame 13 in the axis of the shaft 2. With this arrangement, the flue gases swirl and flow upward in the space defined between the bright flame 13 and the cylindrical layer of the falling material (dust). Like reference numerals and letters in FIG. 2 indicate corresponding elements and parts as described with reference to FIG. 1, and as such their explanation will be omitted.

In order to determine coefficient of surface heat transfer between the cylindrical layer of the falling material and the swirling flue gases in the large heat exchange shaft 2 in the absence of the bright flame, assumptions will now be made that the fuel gases contain about 25 mol percent of $CO_2$ and about 9.2 mol percent of $H_2O$, that the temperature of the gases is 1,000°C, and that the diameter of the gases is 2.5 m. Based on these assumptions, the emissivity of the gases is about 0.25, and the radient heat transfer factor is about 0.2 (if the emissivity of the materials is assumed at a level of 0.5). In accordance with Stefan-Boltzmann's law, the overall radient heat tranfer coefficient can be calculated to be about 67 $Kcal/m^2hr°C$ if the temperature of the layer of the material is assumed to be 850°C. Since the forced heat convection coefficient will then be about 17 $Kcal/m^3hr°C$ with a velocity of gas flow of 15 m/sec, the over-all heat transfer coefficient will be about 84 $Kcal/m^2hr°C$, with a resultant heat transfer per unit area of 12,600 $Kcal/m^2hr$.

Figure 4:
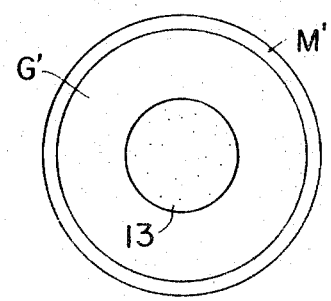
FIG. 4 shows a transverse section of a heat exchange shaft in which a bright flame is generated in accordance with the present invention.

If, on the other hand, the bright flame 13 (Temperature: 1,500°C, Emissivity: 0.7) having a diameter of 1.25 m is assumed to be located within luminous gases G' (Temperature: 1,000°C, Emissivity: 0.25) which are surround by the cylindrical layer M' of the material (Temperature: 850°C, Emissivity: 0.5) as shown in FIG. 4, the over-all heat transfer (Radient Heat Transfer to the cylindrical layer of materials from both the bright flame 13 and the luminous gases plus Convection Heat Transfer between the luminous gases and the cylindrical layer of materials) will reach 33,900 $Kcal/m^2$ hr, thus providing 2.7 times the heat transfer (namely, 12,600 $Kcal/m^2$ hr) calculated in the absence of the bright flame.

A detailed description will now be made of the combustion phenomena in the large heat exchange shaft 2.

Figure 5:
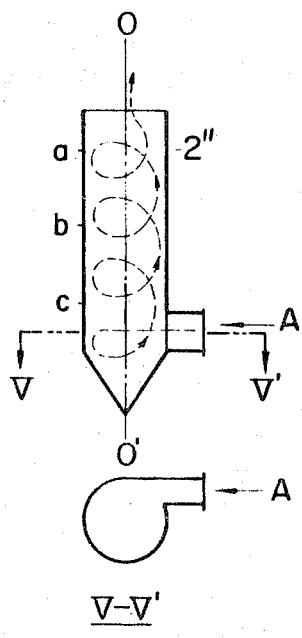
FIGS. 5 and 6 are, respectively, diagramatical and explanatory views showing the velocity of gas flow within the heat exchange shaft.

When the air A is fed into a cylindrical container 2''similar to the large heat exchange shaft 2 in the tangential direction to generate a swirling air flow pattern, as shown in FIG. 5, then the velocity distribution of the internal air flow will be as illustrated in FIG. 6, in which the solid curves indicate the tangential velocity distribution while the dotted curves indicate the axial velocity distribution. Reference characters a, b and c indicate the axial positions of measurement, respectively, and the abscissa indicates the radial distance from the center axis 0 –0' while the ordinate indicates the air flow velocity (m/sec).

As shown in FIG. 6, the tangential flow velocity has a maximum value at an intermediate position between the center axis 0 – 0' and the peripheral wall of the container 2'' and abruptly decreases towards the center axis leaving a relatively quiescent axial core. In the neighborhood of the central axis, the tangential flow velocity becomes zero. This implies that if the diameter of the bright flame is set to be below one half of the internal diameter of the large heat exchange shaft, problems such as the flame being disturbed by the swirling gas flow or the flame being carried in the swirling gas flow and expanded due to the centrifugal force are avoided. The effect of flame expansion leads to the effect that the expanding flame front directly contacts (or fires) the cylindrical layer of the material falling in the vicinity of the inner peripheral wall of the large heat exchange shaft, thus locally heating the material layer up to a temperature exceeding 1,100°C.

In accordance with the present invention, which makes use of an internal combustion by providing a special combustion apparatus in a suspension preheater for use with a cement clinker producing plant with the intention of increasing internal heat exchange, a stable flame is obtained by generating a swirling gas the temperature of which is less than 1,100°C and which is located between the flame and the raw materials to be heated. In this manner the local heating of the raw materials is reduced, so as to avoid excessive heating of the same. In the present, invention sufficient heat exchange can be obtained between the raw materials and the heating agent of the hot gases, which are introduced from the kiln or the like, even when the temperature of the heating agent is maintained lower than a predetermined level (1,100°C).

In accordance with the present invention, moreover, a suspension preheater having a remarkably high heat efficiency can be obtained to greatly reduce the heat consumption per unit weight of clinker and to make the associated apparatus, such as a kiln, highly compact.

The suspension preheater according to the present invention finds its application not only in a cement-clinker producing plant but also in a firing plant for fine ores. It should be understood that the latter application is also within the scope of the present invention although such application has not been described in detail hereinbefore.

What is claimed is:
1. A suspension preheater comprising:
 1. a heat exchange shaft adapted to be substantially vertically disposed during use;
 2. combustion means mounted in the lower portion of said heat exchange shaft for generating a bright flame along the vertical axis thereof;
 3. means for introducing hot working gas into said heat exchange shaft so as to flow tangentially around its vertical axis in a helical flow leaving a relatively quiescent axial core in which said bright flame is generated, said means being located in the lower portion of said heat exchange shaft;
 4. means for introducing particulate raw material into said heat excange shaft adjacent to its inner wall and remote from the relatively quiescent axial core, said means being located in the upper portion of said heat exchange shaft, whereby:
 said particulate raw material will be displaced towards the inner wall of said heat exchange shaft by the centrifugal force of the helical flow of said hot working gases and the heavier particles will fall down in the form of a thin layer adjacent to the inner wall of said heat exchange shaft, separated from said bright flame by said hot working gases, while the lighter particles will be carried upward for further concentration and
 said particular raw material will be subjected to radiant heat generated by said bright flame but will be melted by direct contact with it.

* * * * *